Patented Dec. 9, 1941

2,265,473

UNITED STATES PATENT OFFICE 2,265,473

COATING COMPOSITION

Joseph W. Douglas Cannell, Lakewood, Ohio, assignor to The Sherwin-Williams Company, Cleveland, Ohio, a corporation of Ohio No Drawing. Application July 11, 1939, Serial No. 283,806

6 Claims. (Cl. 106—287)

This invention relates to coating compositions and has for its main object the provision of a coating composition or paint having high reflectance power for the light radiations or colors of the visible spectrum and also a relatively high degree of absorption of the infra-red or heat radiations.

A coating composition or paint embodying my invention is especially adapted for use in improving artificial illumination and may be applied to ceilings and other surfaces where it is desired to have a substantially white reflecting surface for assisting in illuminating some space or object with a high degree of intensity. Commonly used white pigments such as zinc oxide, white lead and titanium oxide have a high reflectance power of infra-red rays, as well as of the visible colors, with the result that the white coating compositions that have heretofore been available are objectionable when a high intensity of artificial illumination is to be used. The reason for this is that the infra-red or heat radiations, which emanate from the source of artificial illumination being used, are reflected by such known coating compositions and when these radiations are absorbed by objects or persons in the space being illuminated the radiant energy is converted into sensible heat. This radiant energy produces a heating effect on the skin and body of persons working in strongly illuminated places such as moving picture studios, drafting rooms and the like, which is very uncomfortable and highly objectionable.

As will be explained more in detail hereinafter my invention overcomes this difficulty by providing a coating composition which is capable of absorbing, to a relatively high degree, the infra-red or heat radiations emanating from a source of artificial illumination. My composition is therefore especially adapted for use in coating the ceiling and walls of rooms requiring a high degree of illumination, and also for coating reflectors for high intensity lamps.

My invention is also applicable to coatings for articles such as radio cabinets, vacuum cleaners, bicycles, automobile bodies, etc., on which it may be desirable to produce a baked finish by infra-red radiations since the incorporation in my improved coating of a medium which absorbs the infra-red results in an increased heating of the coated surfaces because of the absorption, rather than reflection, of the infra-red or heat rays.

Various other objects and possible applications of my invention will be apparent from the following description.

My investigations have been made principally with the common incandescent electric lamps. In such lamps it may be assumed that about 11% of the energy that is put into the lamp is radiated in the form of visible energy, that is to say wave lengths of about 4000 to 8000 angstrom units, and about 70% as infra-red energy or wave lengths above 8000 angstrom units. The other 19% is not radiated but is dissipated by conduction and convection. The net effect of the entire energy output has only a slight effect on the actual temperature of the air in the illuminated space. We are, therefore, only concerned with the radiant energy, that is to say the 11% visible radiation and the 70% infra-red radiation. Disregarding the 19% of conducted and convected heat, the visible and infra-red radiations are here regarded as a unit of 100% or the total radiation, of which about 14% is visible radiation and about 86% is infra-red radiation.

In any case where the useful energy given off by an incandescent lamp consists of the visible radiation, an ideal coating for a reflecting surface would be one which would reflect all the light, or visible radiation, and which would absorb all the infra-red radiation. Such an ideal coating would thus reflect 14% of the total energy, or 100% of the visible radiation and zero per cent of infra-red radiation. A hypothetical coating which would reflect all of the visible and all of the infra-red would reflect 100% of the total energy, or 100% of the available visible energy and 100% of the available infra-red energy. The quotient obtained by dividing the total reflectance of the coated reflecting surface by the amount of the visible reflectance constitutes a measure of how closely the ideal is approached, in the case of any particular coating. The lower this quotient is, the lower is the reflectance of the infra-red energy in comparison with the visible energy.

In the first example given above where there was complete reflectance of the visible radiation and complete absorption of the infra-red radiation we would have a total reflectance of 14% and a visible reflectance of 100% and the quotient would be 0.14. In the second case, with a coating composition which completely reflected all of the radiant energy, we would have a total reflectance of 100% and a visible reflectance of 100% and the quotient would be 1.0.

Studied under the light from ordinary incandescent lamps it has been found that white paints on the market have as a factor, representing the quotient of the total reflectance divided by the visible reflectance, from 0.85 to 0.95.

We may represent the quotient above referred to by the formula $$\frac{RT}{RV}$$

in which RT represents total reflectance and RV visible reflectance. While the $$\frac{RT}{RV}$$

factor of ordinary white paints now on the market is, as above stated, from 0.85 to 0.95, the $$\frac{RT}{RV}$$

factor of a white paint made in accordance with my invention is from 0.45 to 0.50, thus showing a high degree of absorption of the infra-red radiation. In other words its capacity for reflecting visible radiation is about twice as great as its capacity for reflecting infra-red energy.

A typical paint embodying my invention may be made in accordance with the following formula:

| | |
|---|---|
| Zinc oxide (ZnO) pounds | 1152 |
| Basic copper phosphate ($Cu_3(PO_4)_2.Cu(OH)_2$) do | 128 |
| Varnish gallons | 19½ |
| Linseed oil do | 9½ |
| Liquid drier do | 1 |
| Mineral spirits do | 42 |

These materials will be mixed in the usual way that is employed in making ordinary commercial paints, and it will be noted that of the pigment contained in the paint 90% is zinc oxide, a white pigment, and 10% is basic copper phosphate, which is a pale green pigment. The paint has a color which approaches pure white but has a perceptible greenish shade. This paint has a reflection factor for visible radiation from incandescent lamps of approximately 75 to 80%, and a reflection factor for total radiation of 30 to 35%.

While the above formula comprises zinc oxide as the white pigment and basic copper phosphate as the secondary pigment, the essential ingredient in reducing the amount of infra-red reflectance is the basic copper phosphate. Any of the following commercially used white pigments may be used with the basic copper phosphate and the same type of effect, on infra-red radiation, will result. The other white pigments referred to are:

> Basic lead carbonate
> Lithopone
> Zinc Sulfide
> Titanium Dioxide
> Basic lead sulfate
> Leaded zinc
> Antimony oxide
> Silica
> Magnesium silicate
> Aluminum silicate
> Whiting or a mixture of any of these. Also any paint vehicle may be used including vegetable or animal drying oils:

> Synthetic or natural resin varnishes
> Chlorinated rubber
> Casein or other water soluble binders The percentage of basic copper phosphate to total pigment may be varied, the figure of 10% being used in the above formula because it gives a relatively high light reflectance together with a substantial absorption of infra-red.

Paints made up substantially in accordance with the foregoing formula, but with variations in the percentage of basic copper phosphate, in the total amount of pigment, were found to produce the following results:

| BCP | RV | RT | $\frac{RT}{RV}$ |
|---|---|---|---|
| 10% | 78 | 35 | .45 |
| 15% | 68.8 | 24 | .35 |
| 20% | 66 | 18 | .27 |

Copper pyrophosphate, the chemical formula for which is believed to be:

$$Na_2CuP_2O_7.3Cu_2P_2O_7.20H_2O$$

will also give the desired type of effect.

While other copper compounds may be used as the secondary pigment and the infra-red absorption thereby increased, they are objectionable for other reasons and most of them have a relatively high tinting effect, because of their color and, therefore, materially reduce the reflectance of the visible radiations and it is important that the reflectance of visible radiations be at a maximum. Such compounds as copper sulfate are objectionable because of being water-soluble and, from the commercial standpoint, the paint pigments must be insoluble in water. The basic copper phosphate appears to be the optimum material for securing the maximum infra-red absorption with a minimum reduction in the reflectance of visible radiation. It has the advantage of having a pale green color of low tinting strength, is insoluble in water, and does not introduce objectionable characteristics into the paint in which it is incorporated.

When the basic copper phosphate is incorporated in a coating composition to be used in producing a baked finish on articles or surfaces by infra-red radiations it acts to more readily absorb the infra-red rays being directed against such articles or surfaces, thereby serving as a means for forcing the baking and shortening the time required.

In white coating compositions for ceilings, walls and other reflecting surfaces I have found that while an increase in the amount of basic copper phosphate in the pigment will increase the infra-red absorption, it will also, because of its tinting effect, reduce the amount of the reflectance of visible radiations and, therefore, I have found that, for commercial purposes, the amount of reflectance of the visible radiations should not be substantially below 75%, and the reflectance of the infra-red should not be above 35%. An increase in the absorption of infra-red, at the expense of reflectance of the visible radiations, must be compensated for by an increase in the amount of electrical energy that is put into the lamp in order to maintain the desired degree of illumination, and, therefore, it does not appear to be economical to increase the amount of basic copper phosphate to such an extent that the reflectance of the visible radiations will be reduced substantially below 75%.

While I have given a specific formula for a paint embodying my invention it will be understood that this is only for the purpose of illustrating a preferred embodiment of my invention and that the invention is not limited to the combination of ingredients set forth in said formula, as other materials may be used in varying proportions and with different vehicles to produce a similar effect. The essential feature of my invention is the discovery that it is possible, by the incorporation of a relatively small amount of basic copper phosphate in a coating composition to reduce, by as much as one-half, the amount of infra-red reflection without materially or objectionably reducing the reflection of the visible radiation.

Having thus described my invention, I claim:

1. A coating composition of relatively high reflectance of the visible colors of the spectrum and having a relatively high capacity for absorbing infra-red radiations and consisting of a liquid vehicle and pigment materials, the major portion of said pigment materials having relatively high reflectance of the visible colors of the spectrum, and the minor portion being basic copper phosphate.

2. A substantially white coating composition having a relatively high capacity for absorbing infra-red radiations and consisting of a liquid vehicle with which there is mixed a composite pigment the major portion of which is a substantially white pigment having a relatively high degree of reflectance of visible radiations and the minor portion of which is basic copper phosphate.

3. A substantially white coating composition having a relatively high capacity for absorbing infra-red radiations and consisting of a liquid vehicle with which there is mixed a composite pigment of which not more than 25% is basic copper phosphate and the balance is a substantially white pigment having a relatively high degree of reflectance of visible radiations.

4. A coating composition having a relatively high capacity for reflecting visible radiations of the spectrum and consisting of a liquid vehicle and pigment material, the major portion of said pigment material consisting of a pigment having a relatively high capacity for reflecting visible radiations and the minor portion of which consists of basic copper phosphate.

5. A coating composition having a relatively high capacity for reflecting visible radiations of the spectrum and consisting of a liquid vehicle and pigment material of which not more than 25% is basic copper phosphate and the balance is a pigment having a relatively high capacity for reflecting visible radiations.

6. A coating composition having a relatively high capacity for reflecting visible radiations of the spectrum and consisting of a liquid vehicle with which there is mixed a plurality of pigments of which the major portion has a relatively high capacity for reflecting visible radiations and the minor portion is a copper pigment of low tinting strength and relatively high capacity for absorbing infra-red radiations.

JOSEPH W. DOUGLAS CANNELL.